(12) United States Patent
Judas et al.

(10) Patent No.: US 9,889,945 B2
(45) Date of Patent: Feb. 13, 2018

(54) INTAKE FOR AN ENGINE OF AN AIRCRAFT

(71) Applicant: Airbus Defence and Space GmbH, Ottobrunn (DE)

(72) Inventors: Michael Judas, Munich (DE); Bartholomaeus Bichler, Raubling (DE)

(73) Assignee: Airbus Defence and Space GmbH, Ottobrunn (DE)

( * ) Notice: Subject to any disclaimer, the term of this patent is extended or adjusted under 35 U.S.C. 154(b) by 188 days.

(21) Appl. No.: 14/649,754

(22) PCT Filed: Dec. 2, 2013

(86) PCT No.: PCT/DE2013/000712
§ 371 (c)(1),
(2) Date: Jun. 4, 2015

(87) PCT Pub. No.: WO2014/086329
PCT Pub. Date: Jun. 12, 2014

(65) Prior Publication Data
US 2015/0314883 A1 Nov. 5, 2015

(30) Foreign Application Priority Data
Dec. 5, 2012 (DE) .................. 10 2012 023 718

(51) Int. Cl.
*B64D 33/02* (2006.01)
(52) U.S. Cl.
CPC ........ *B64D 33/02* (2013.01); *B64D 2033/022* (2013.01)

(58) Field of Classification Search
CPC .................... B64D 33/02; B64D 2033/022
See application file for complete search history.

(56) References Cited

U.S. PATENT DOCUMENTS 3,329,377 A * 7/1967 Peterson ............... B64D 15/00
244/53 B
3,971,218 A * 7/1976 Toth, Jr. .................. F01D 9/06
415/121.2

(Continued)

FOREIGN PATENT DOCUMENTS

CN 101855135 A 10/2010
DE 888 510 B 9/1953

(Continued)

OTHER PUBLICATIONS

International Search Report (PCT/ISA/210) dated Jun. 3, 2014 with English-language translation (seven (7) pages).

(Continued)

*Primary Examiner* — Brian M O'Hara
*Assistant Examiner* — Keith L Dixon
(74) *Attorney, Agent, or Firm* — Crowell & Moring LLP

(57) ABSTRACT

An intake for feeding air to an engine of an aircraft includes an opening for sucking in air, which opening faces in the direction of movement of the aircraft; and an air duct between the opening and the engine, which air duct is curved such that an impact region is arranged in the air duct after the opening in relation to the direction of movement of the aircraft. An object flying into the opening contacts the impact region. The impact region has a penetration region, which is designed to be penetrated by the impinging object.

15 Claims, 6 Drawing Sheets

(56) References Cited

U.S. PATENT DOCUMENTS

| | | | | |
|---|---|---|---|---|
| 4,346,860 A | * | 8/1982 | Tedstone | F02C 7/05 244/53 B |
| 4,354,346 A | | 10/1982 | Wooding | |
| 4,456,458 A | * | 6/1984 | Gilbertson | B01D 45/04 244/53 B |
| 4,617,028 A | | 10/1986 | Ray et al. | |
| 4,713,934 A | * | 12/1987 | Pellow | F02C 7/05 222/541.6 |
| 4,972,672 A | * | 11/1990 | Sanderson | F02C 7/052 55/306 |
| 5,697,394 A | | 12/1997 | Smith et al. | |
| 5,779,189 A | * | 7/1998 | Hamstra | B64C 7/00 137/15.1 |
| 5,906,334 A | * | 5/1999 | Chamay | B64D 33/02 244/53 B |
| 5,971,000 A | | 10/1999 | Koncsek et al. | |
| 2010/0212285 A1 | | 8/2010 | Negulescu | |
| 2013/0206920 A1 | | 8/2013 | Bichler et al. | |

FOREIGN PATENT DOCUMENTS

| | | |
|---|---|---|
| DE | 914 920 B | 7/1954 |
| DE | 32 42 248 A1 | 6/1983 |
| DE | 37 13 875 C1 | 7/1988 |
| DE | 39 01 010 C1 | 8/1990 |
| DE | 10 2010 023 938 A1 | 12/2011 |
| EP | 2 223 856 A2 | 9/2010 |
| EP | 2 327 627 A2 | 6/2011 |
| GB | 2 149 017 A | 6/1985 |
| RU | 2 182 670 C2 | 5/2002 |
| RU | 2 271 964 C1 | 3/2006 |
| RU | 80431 U1 | 2/2009 |
| WO | WO 02/12690 A1 | 2/2002 |

OTHER PUBLICATIONS

German-language Written Opinion (PCT/ISA/237) dated Jun. 3, 2014 (six (6) pages).

Chinese Office Action issued in Chinese counterpart application No. 201380063793.5 dated Apr. 5, 2016 (Eight (8) pages).

Russian Search Report issued in Russian counterpart application No. 2015123293/11(036321) dated Oct. 27, 2017 (Seven (7) pages).

* cited by examiner

INTAKE FOR AN ENGINE OF AN AIRCRAFT

FIELD OF THE INVENTION

The invention relates to an inlet for feeding air to an engine, and an aircraft.

BACKGROUND OF THE INVENTION

In particular during takeoff and landing, and also while flying at low altitude, birds may collide with an aircraft, such as an airplane, and may damage the aircraft In the event of such a 'bird strike' the engines (such as the fan and/or compressor) may be damaged when the bird or generally other objects contacting the aircraft enter the intake of the engine. This can result in high costs for the repair or the replacement of the engine.

One approach is to design and to test the engine for a defined bird strike (i.e., an impinging object with maximum weight, maximum density, etc.). This may mean that the engine indeed may be damaged, but in spite of the bird strike does not fail during the flight. The engine can function with reduced output until a safe landing.

SUMMARY OF THE INVENTION

The object of the invention is to make an aircraft safer, wherein only low maintenance costs are incurred.

This object is achieved in accordance with embodiments of the invention.

One aspect of the invention relates to an intake for feeding air to an engine of an aircraft. The aircraft may comprise one or more turbines, with which the air from the intake is compressed and ejected again in order to propel the aircraft.

In accordance with one embodiment of the invention, the intake comprises an opening or an inlet for sucking in air, which points in the direction of movement of the aircraft, and an air duct between the (outer) opening and the engine, i.e. an outlet of the air duct. The air duct is curved in such a way that an impact region in the air duct is arranged after the opening in relation to the direction of movement of the aircraft, such that an object flying into the opening generally hits the impact region. In other words, the air duct of the intake does not run in a straight line to the engine, but can be curved, for example such that there does not have to be a direct line of sight between the opening of the intake and the engine.

An object flying into the intake along the direction of movement of the aircraft generally contacts an inner wall of the air duct (the impact region). The direction of movement may be a direction of continued movement of the aircraft. The direction of movement may correspond substantially to a longitudinal axis of the aircraft.

In accordance with one embodiment of the invention, the impact region has a penetration region or a predetermined breaking region or predetermined breaking point, which is designed to be penetrated by the impinging object. By way of example, the penetration region may be destroyed or heavily deformed in the event of contact with the objet flying in. A penetration of the penetration region may signify, here, a plastic deformation of the penetration region. The penetration region may be a component part or an arrangement of component parts in the inner wall of the air duct and/or behind the inner wall, which component part or arrangement of component parts is designed to shatter or to heavily deform in order to absorb at least some of the energy of the impinging object.

The impinging object can infiltrate the penetration region and/or can break through the penetration region and can be deflected away from the engine. It is thus possible to prevent a bird, for example, from infiltrating the engine, and further subsequent damage can be avoided. Since the remains of the bird or at least a large part of these remains normally do not pass into the engine, the risk of damage to the engine is heavily reduced.

The penetration region (or the component part or the component parts or materials thereof) can be designed as replacement parts, which can be economically replaced during maintenance following contact with an object. By means of the introduction of a penetration region, a component part that can be easily replaced can be penetrated by a bird, for example, such that said bird does not reach the intake duct. It is thus possible to prevent the bird from damaging the engine, which is generally expensive. The aircraft remains able to continue the flight and to land safely. The comparatively economical replacement part can then be changed.

It is also possible that the intake intercepts impinging objects with high impact energy. An aircraft can also be protected against heavy birds. Even at high speed, an aircraft can be protected against objects infiltrating the intake.

In accordance with one embodiment of the invention, at least part of the intake protrudes from the aircraft. By way of example, the region of the intake after the opening may be shaped in a shell-like manner. The penetration region can be arranged in the part of the intake protruding from the aircraft.

In accordance with one embodiment of the invention, the part of the intake protruding from the aircraft is separated at least partially from the aircraft upon impact of the object. In this way, the output of the engine indeed may be reduced, but on the other hand the aircraft can still land safely without difficulty, and a repair of the aircraft is possible by simple installation of an economical replacement part.

In accordance with one embodiment of the invention the penetration region extends from an inner wall of the air duct to an outer wall of the intake, such that an object contacting the penetration region breaks through the penetration region (with sufficiently high impact energy) and leaves the aircraft. The impinging object can be deflected away from the engine, for example by breaking through a part protruding from the aircraft (in a straight line). In this case as well the output of the engine indeed may be reduced. However, the aircraft can land without difficulty and can be repaired economically.

In accordance with one embodiment of the invention, the penetration region comprises a cavity or a hollow space, in which the object contacting the penetration region is stopped. By way of example a cavity may be arranged behind an inner wall, which is designed to break upon impact of an object, the impinging object being received in said cavity.

In accordance with one embodiment of the invention, the penetration region comprises a material that at least partially absorbs an impact energy of the impinging object. This material may be, for example, an inner wall of the air duct, which is designed to break upon impact of the object. By way of example, the material may be a plastic and/or a lightweight structure, whereas other parts of the inner wall consist of metal. It is also possible that the material can absorb the entire movement energy of the impinging object by way of plastic deformation, this material being a foam, for example.

In accordance with one embodiment of the invention, the penetration region comprises a first material, which is designed to absorb a first part of an impact energy of the impinging object, and a second material, which is arranged after the first material in relation to the direction of movement of the aircraft and which is designed to absorb a remaining part of the impact energy. By way of example, the first material may be an easily destroyable part of the inner wall of the air duct, and the second material may be a foam.

In accordance with one embodiment of the invention, a material for absorbing an impact energy is arranged in a cavity that serves to stop the impinging object. By way of example, the cavity can be lined with this material, for example foam.

In accordance with one embodiment of the invention, the penetration region comprises a flap, which in a closed position provides part of an inner wall of the air duct. The flap can be held in an open position by means of material arranged in the penetration region.

In accordance with one embodiment of the invention, the flap is preloaded by way of a spring mechanism, such that the flap, after infiltration of the impinging object into the penetration region, closes the inner wall of the air duct. By way of example, the impinging object may clear away a material in the penetration region that holds the flap in the open position, and may thus release the flap. Even after the contact of the object, the air duct can thus continue to perform its function without great limitation. The air flowing through the opening of the intake can be conveyed further on to the engine.

In accordance with one embodiment of the invention, a surface of the penetration region in the air duct is provided with a radar-absorbing material. The surface, for example the surface of the flap or the surface of a material of the inner wall of the penetration region, for example may comprise such a material or may be coated therewith. In particular, a replacement part of the penetration region can be produced or disguised with radar-absorbing material.

In accordance with one embodiment of the invention, the air duct in a surrounding environment of the penetration region has a curvature through at least 90° (for example up to 180°). The air duct may comprise an intake manifold, in which the penetration region is arranged. Predetermined breaking points can be installed in this intake manifold and also in the (outer) covering. A defined region at the intake manifold can thus be designed such that a bird, for example, breaks through the inner wall and no longer infiltrates the region in front of the engine.

A further aspect of the invention relates to an aircraft, for example a manned or unmanned aircraft or a drone. The aircraft may be a disguised aircraft, which has a low radar signature, a low infrared signature and/or low acoustic signature. The aircraft may be a flying wing.

In accordance with one embodiment of the invention, the aircraft comprises at least one intake, as has been described above and as will be described below, and an engine, which is arranged offset in relation to the opening of the intake. Here, an object flying into the intake contacts the penetration region, is generally deflected from the air duct of the intake, and cannot infiltrate the engine.

It is possible that the demands on the engine in terms of bird strike are reduced in this way. The weight of the engine can thus be reduced. Whereas conventional engine designs are generally designed for a maximum bird strike (which is derived statistically), it is possible to ensure by way of the predetermined breaking point that even heavy birds do not damage the engine.

In particular for military aircraft, which generally also operate at low flying altitude, at which most birds are normally found, the problems emanating from a bird strike can be reduced.

In accordance with one embodiment of the invention, the engine is arranged against the direction of movement of the aircraft. By means of a reverse engine integration, a radar signature of the aircraft can be reduced further than with a conventionally disguised intake.

Exemplary embodiments of the invention will be described hereinafter in greater detail with reference to the accompanying drawings.

BRIEF DESCRIPTION OF THE DRAWINGS

In principle, identical or similar parts are provided with like reference signs.

DETAILED DESCRIPTION OF EXEMPLARY EMBODIMENTS

Figure 1:
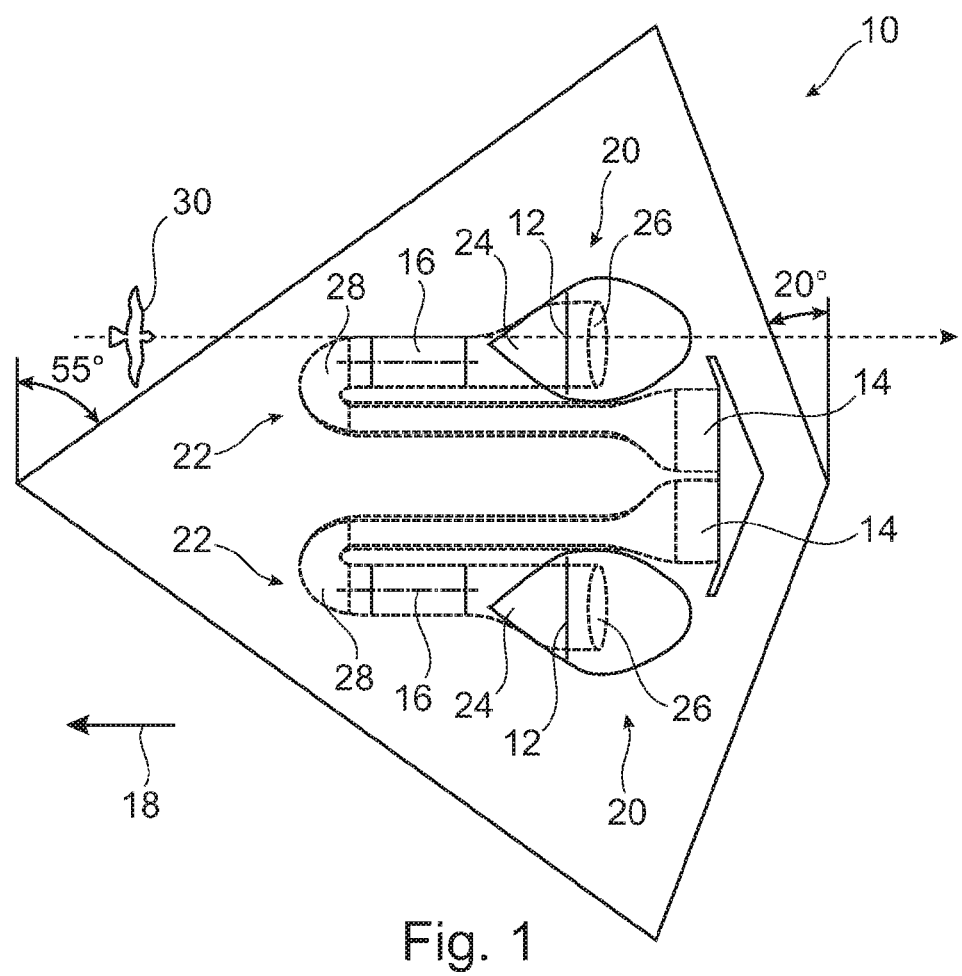
FIG. 1 shows a schematic plan view of an aircraft in accordance with one embodiment of the invention.

FIGS. 1 to 4 show an aircraft 10 in the form of a highly disguised flying wing.

The aircraft 10 has a substantially kite-like, flat form, in which all engine openings (intake opening 12 and outlet opening 14) are arranged on an upper side.

Two engines 16 are arranged laterally, symmetrically with respect to a center axis of the aircraft 10 and are arranged against the direction of movement 18 of the aircraft 10. Also symmetrically with respect to the center axis, there is associated with each engine 16 an intake 20, by which air is fed to the respective engine 16, and an outlet 22, via which the air compressed by the engine 16 is rejected rearward (against the direction of movement 18).

Here, the air flows into an intake opening 12, which points in the direction of movement 18, and then into an air duct 24, which leads to the engine 16. The air duct 24 has a region 26 with a curvature through 180°, which runs from top to bottom (with respect to a normal flying position of the aircraft 10).

After the curved region 26, the air duct 24 leads into the engine 16. The outlet 22 has a region 28 with a curvature through 180°, which runs orthogonally to the curvature of the region 26. After the region 28, the outlet 22 leads into the outlet opening 14.

Figure 2:
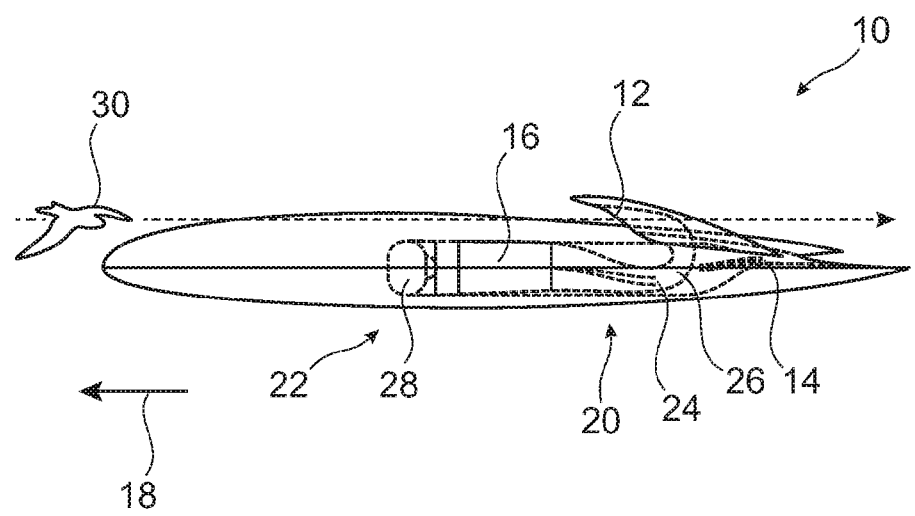
FIG. 2 shows a schematic side view of the aircraft from FIG. 1.
Figure 3:
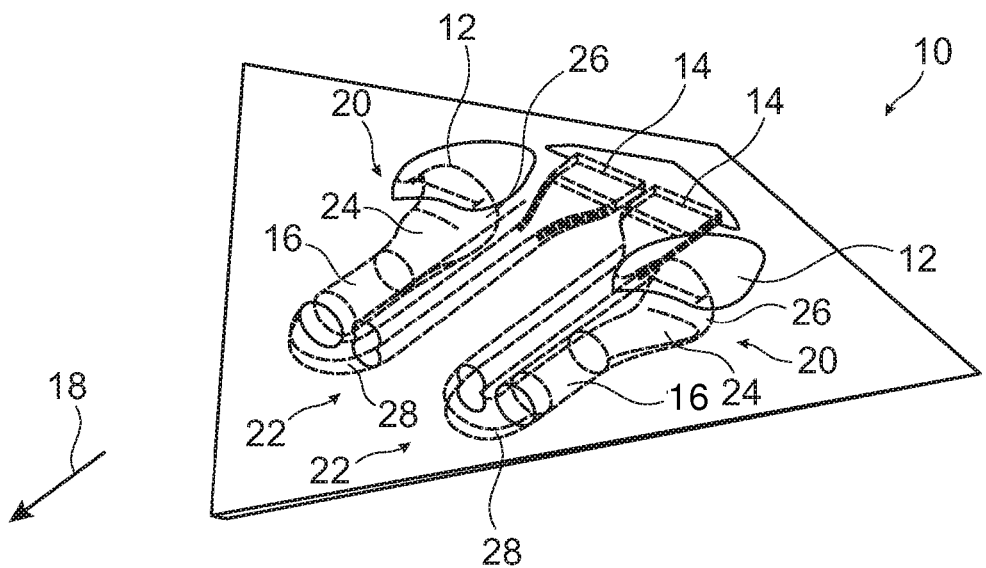
FIG. 3 shows a schematic view diagonally from above of the aircraft from FIG. 1.
Figure 4:
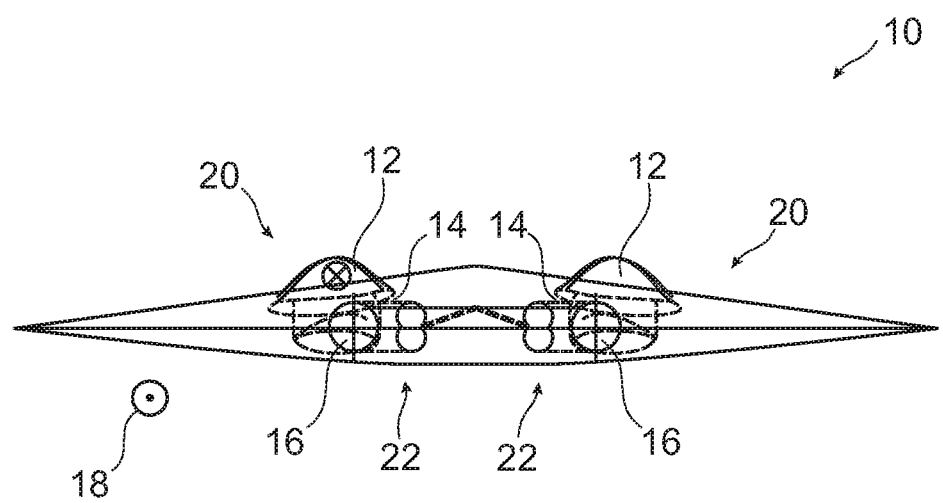
FIG. 4 shows a schematic view from the front of the aircraft from FIG. 1.

In FIGS. 1 and 2, an object 30 (a bird) is shown, which flies into one of the intakes 20 against the direction of movement 18 of the aircraft 10.

The aircraft 10 shown in FIGS. 1 to 4 has an intake 20 (or two intakes 20) with penetration region, as is described in greater detail in the following figures.

Figure 5:
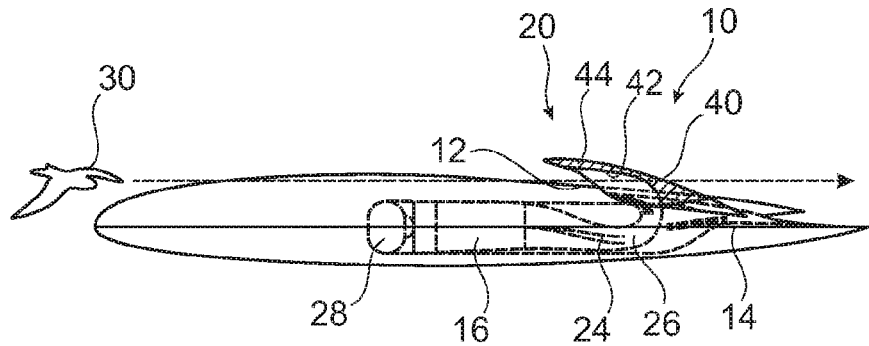
FIG. 5 shows a schematic side view of an aircraft in accordance with one embodiment of the invention.
Figure 6:
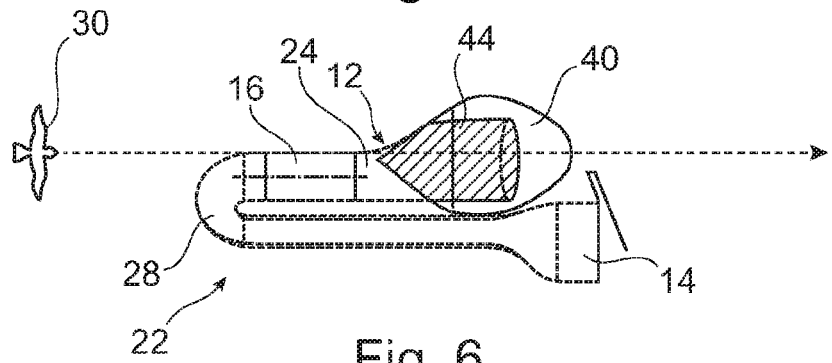
FIG. 6 shows a schematic plan view of the aircraft from FIG. 5.

FIGS. 5 and 6 show that the intake 20 may have a shell-shaped part 40, which protrudes (upwardly) from the aircraft 10. When the object 30 reaches the intake 20, it contacts an inner surface of the part 40, in other words it contacts an impact surface or an impact region 42, which is arranged after the opening 12. The impact region 42 lies in the region 26 of the curvature of the air duct 24.

In the embodiment of FIGS. 5 and 6, the entire part 40 protruding from the aircraft 10 is designed as a penetration region 44, i.e. it consists for example of a material that breaks upon impact of the object 30 or tears away from the aircraft 10 or intake 20. The predetermined breaking point may comprise the covering of the intake 20, which covering protrudes from the aircraft 10. An object 30 contacting the penetration region 44 breaks through the penetration region 44 and thus does not reach the engine 16, since it leaves the aircraft 10 again.

Figure 7:
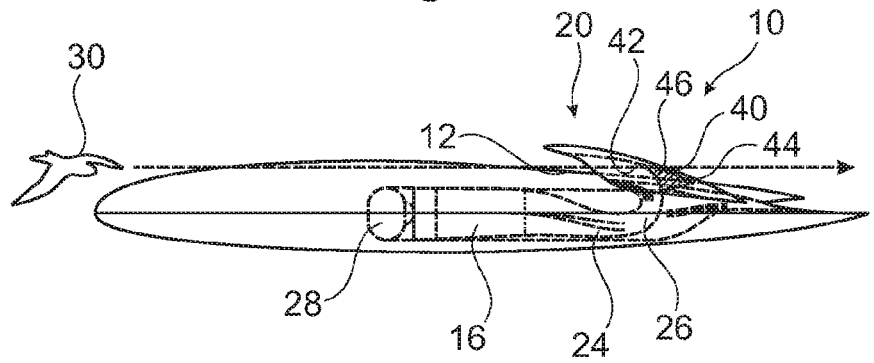
FIG. 7 shows a schematic side view of an aircraft in accordance with one embodiment of the invention.
Figure 8:
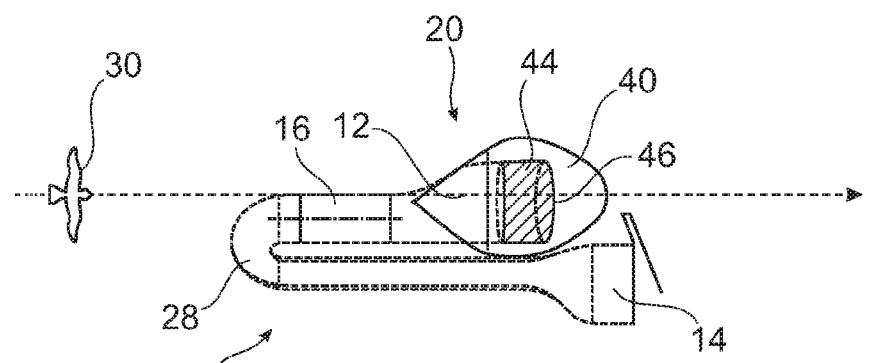
FIG. 8 shows a schematic plan view of the aircraft from FIG. 7.

In the embodiment of FIGS. 7 and 8, a penetration region 44 is provided in the part 40 protruding from the aircraft 10 and leads into a cavity 46. The penetration region 44 of FIGS. 6 and 7 may also comprise a material that breaks or tears away from the aircraft 10 or intake 20 upon impact of the object 30. An object 30 contacting the predetermined breaking point 44 breaks through the predetermined breaking point 44 and thus does not pass into the engine 16, since it lands in the cavity 46.

Figure 9:
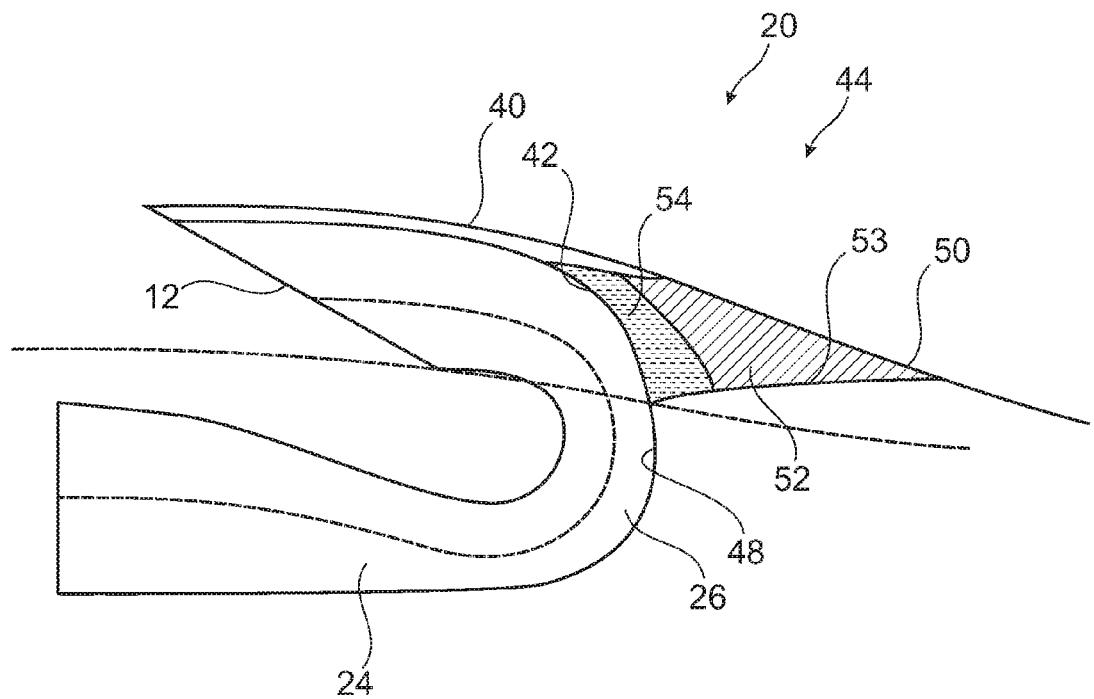
FIG. 9 shows a schematic cross section through an intake in accordance with one embodiment of the invention.

FIG. 9 shows a cross section through an intake 20, in which the penetration region 44 extends from an inner wall 48 to an outer wall 50 of the intake 20 (or of the protruding part 40). The penetration region 44 comprises a material 52 (for example a light foam material), which can be penetrated by an object 30, and which can also absorb some of the movement energy of the object 30. The material 52 provides part of the inner wall 48 of the air duct 24 in the region of the curvature 26 and is coated with a radar-absorbing material 54. The material 52 also provides part of the outer wall 50.

FIG. 9 also shows a ramp portion 53, which is arranged in the penetration region 44 and is used to steer an object 30 penetrating or flying through the penetration region 44 in a new direction, which, for example, points away from the direction of movement 18 of the aircraft 10. In this way the object 30 can be steered away from component parts after the intake 20.

Figure 10:
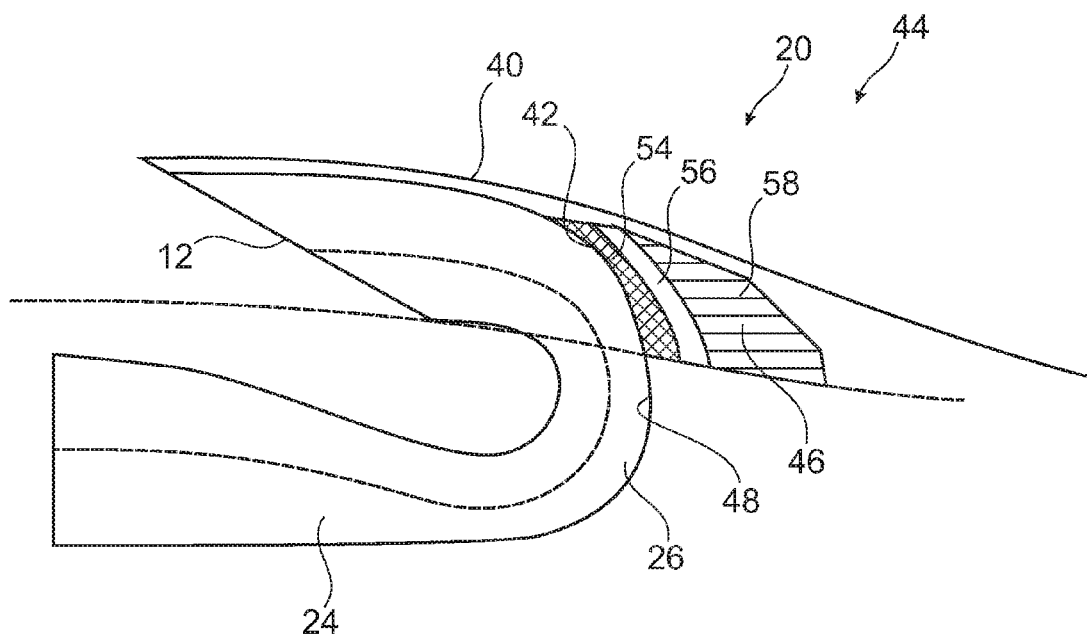
FIG. 10 shows a schematic cross section through an intake in accordance with one embodiment of the invention.

FIG. 10 shows a cross section through an intake 20, in which a penetration region provides part of the inner wall of 48 of the air duct 24 and leads into a cavity 46. The cavity 46 is designed such that an object 30 flying into the cavity 46 remains in the cavity 46 (and, for example, cannot break through the rear wall thereof). A first material 56 is arranged in the cavity and can be broken through or penetrated by an object 30, and is used as a first impact absorber, for example can absorb a first part of the movement energy of the object 30. A second material 58 is arranged after the first material 56 in the cavity 46 and can absorb the remaining movement energy of the object 30.

Figure 11:
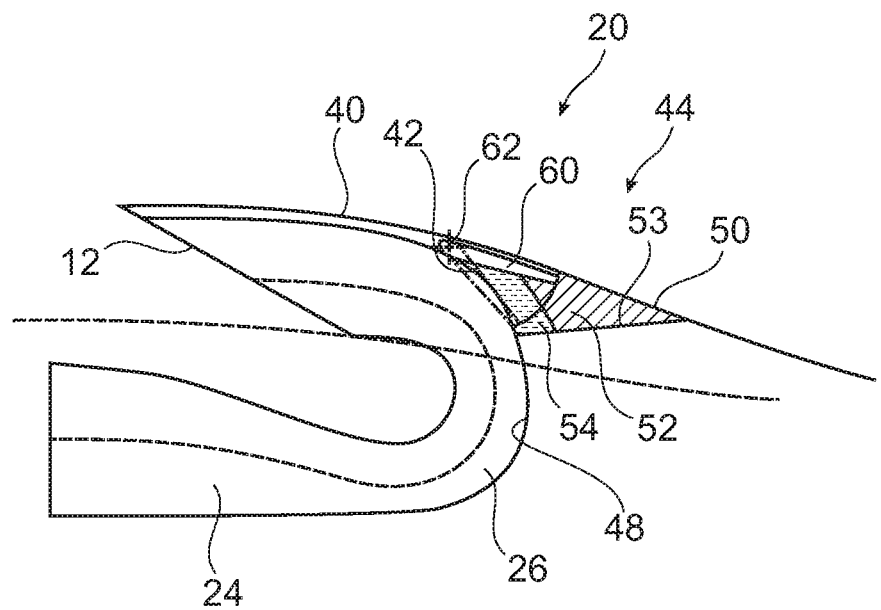
FIG. 11 shows a schematic cross section through an intake in accordance with one embodiment of the invention.
Figure 12:
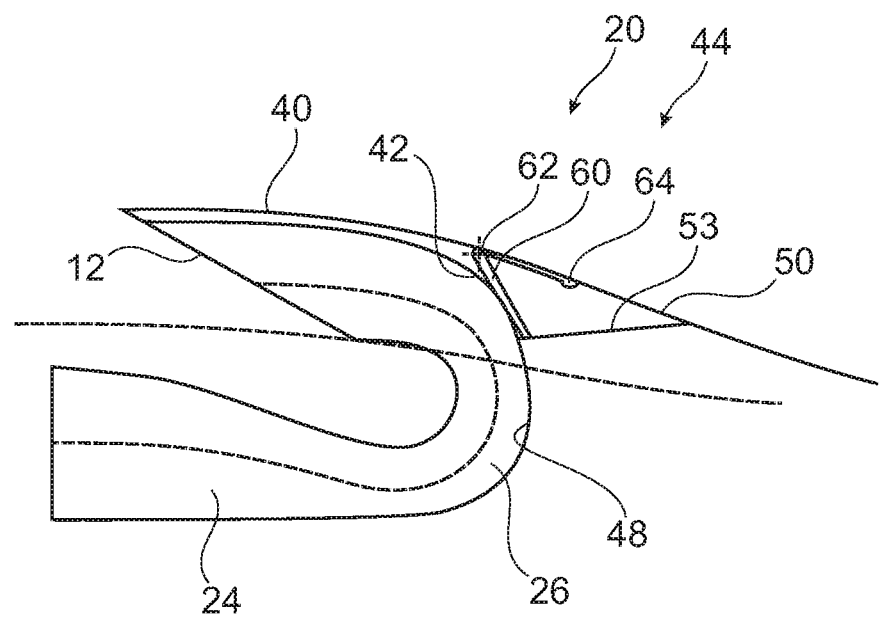
FIG. 12 shows a schematic cross section through an intake from FIG. 11, once a flap has been closed.

FIGS. 11 and 12 show an intake 20 similar to FIG. 9, but equipped with a flap 60.

As FIG. 11 shows, the flap 60 is held in an open position by the material 52, 54. The flap 60 has a spring mechanism 62, which is preloaded in such a way that the flap 60 closes when an object 30 has broken through and/or has cleared away the material 54, 52 (see FIG. 12). As is shown in FIG. 12, the flap 60 in the closed position forms part of the inner wall 48 of the air duct 24.

Figure 13:
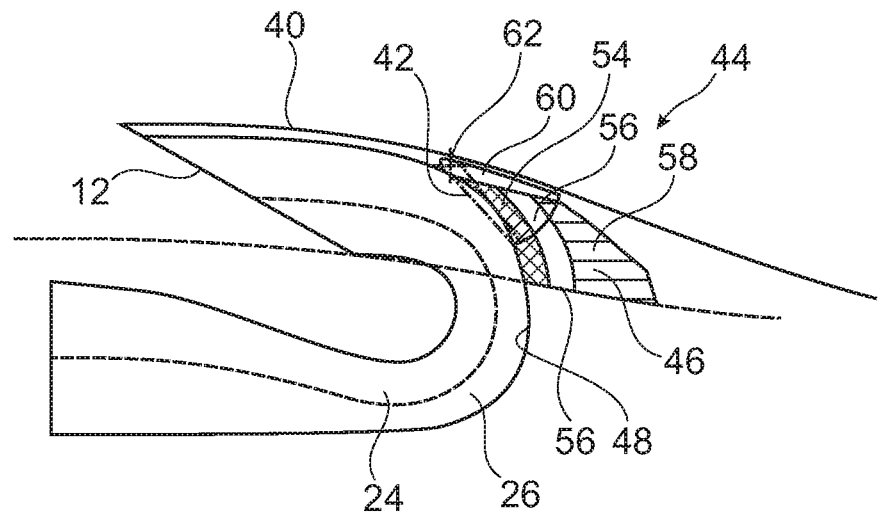
FIG. 13 shows a schematic cross section through an intake in accordance with one embodiment of the invention.
Figure 14:
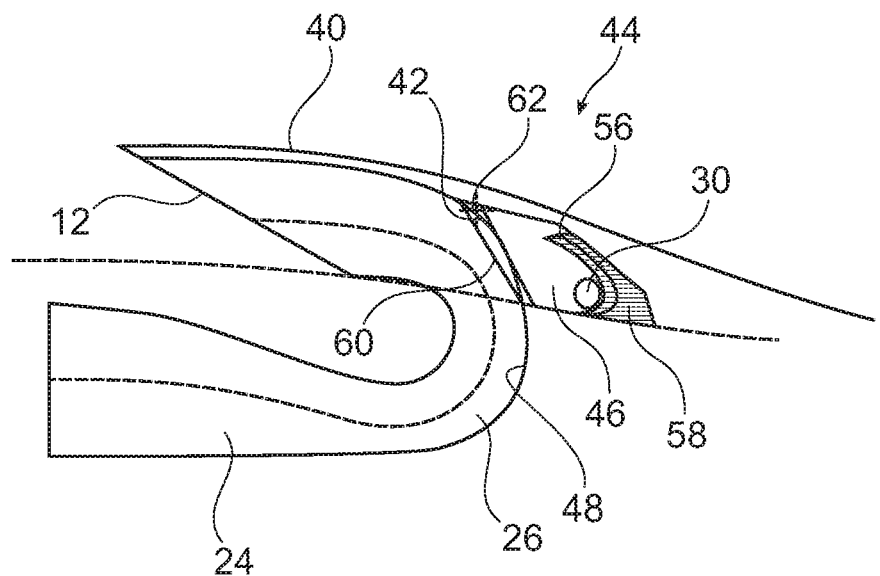
FIG. 14 shows a schematic cross section through an intake from FIG. 13, once a flap has been closed.

FIGS. 13 and 14 show an intake 20 similar to FIG. 10, which is equipped with a flap 60 similarly to FIGS. 11 and 12. FIG. 13 shows that the flap is held in the open position by the material 54, 56, 58. FIG. 14 shows the flap 60 in the closed position once the object 30 has cleared away and compacted the material 54, 56, 58.

In addition it is noted that "comprising" does not rule out any other elements or steps, and "a" or "one" does not rule out a plurality. It is also noted that features or steps that have been described with reference to one of the above exemplary embodiments can also be used in combination with other features or steps of other above-described exemplary embodiments. Reference signs in the claims are not to be considered as limiting.

The invention claimed is:

1. An intake for feeding air to an engine of an aircraft, comprising:
    an opening for sucking in air, the opening facing a direction of movement of the aircraft; and
    an air duct between the opening and the engine, wherein the air duct is curved in a way that an impact region is arranged in the air duct after the opening in relation to the direction of movement of the aircraft, such that an object flying into the opening contacts the impact region;
    wherein the impact region has a predetermined breaking region, which is arranged in a shell-shaped part of the intake, and wherein the predetermined breaking region protrudes from the aircraft and is designed to separate from the aircraft upon impact of a bird as the impinging object.

2. The intake as claimed in claim 1,
    wherein at least part of the intake protrudes from the aircraft;
    wherein the predetermined breaking region is arranged in the part of the intake protruding from the aircraft.

3. The intake as claimed in claim 2,
    wherein the part of the intake protruding from the aircraft is separated from the aircraft upon impact of the object.

4. The intake as claimed in claim 1,
    wherein the predetermined breaking region extends from an inner wall of the air duct to an outer wall of the intake, such that the object contacting the predetermined breaking region penetrates the predetermined breaking region and leaves the aircraft.

5. The intake as claimed in claim 1,
    wherein the predetermined breaking region comprises a cavity, in which the object contacting the predetermined breaking region is stopped.

6. The intake as claimed in claim 1,
    wherein the predetermined breaking region comprises a material that at least partially absorbs an impact energy of the object.

7. The intake as claimed in claim 1,
wherein the predetermined breaking region comprises a first material, which is designed to absorb a first part of an impact energy of the impinging object, and comprises a second material, which is arranged after the first material in relation to the direction of movement of the aircraft and which is designed to absorb a remaining part of the impact energy.

8. The intake as claimed in claim 5,
wherein a material for absorbing an impact energy is arranged in the cavity that serves to stop the object.

9. The intake as claimed in claim 1,
wherein a deflection ramp is arranged in the predetermined breaking region and is configured to deflect the object penetrating the predetermined breaking region in a first direction into another direction.

10. The intake as claimed in claim 1,
wherein the predetermined breaking region comprises a flap, which in a closed position provides part of an inner wall of the air duct.

11. The intake as claimed in claim 10,
wherein the flap is preloaded by a spring mechanism, such that the flap closes the inner wall of the air duct following an infiltration of the object into the predetermined breaking region.

12. The intake as claimed in claim 1,
wherein a surface of the predetermined breaking region in the air duct is provided with a radar-absorbing material.

13. The intake as claimed in claim 1,
wherein the air duct in a surrounding environment of the predetermined breaking region has a curvature through at least 90°.

14. An aircraft, comprising:
an engine;
an intake for feeding air into the engine, the intake comprising
an opening for sucking in air, the opening facing a direction of movement of the aircraft; and
an air duct between the opening and the engine, wherein the air duct is curved in a way that an impact region is arranged in the air duct after the opening in relation to the direction of movement of the aircraft, such that an object flying into the opening contacts the impact region;
wherein the impact region has a predetermined breaking region, which is arranged in a shell-shaped part of the intake, and wherein the predetermined breaking region protrudes from the aircraft and is designed to separate from the aircraft upon impact of a bird as the impinging object;
wherein the engine is arranged offset in relation to the opening of the intake.

15. The aircraft as claimed in claim 14,
wherein the engine is arranged in an opposite direction of movement of the aircraft.

* * * * *